I. REIMER.
FLOATING FISHTRAP.
APPLICATION FILED NOV. 22, 1920.
1,393,907.  Patented Oct. 18, 1921.
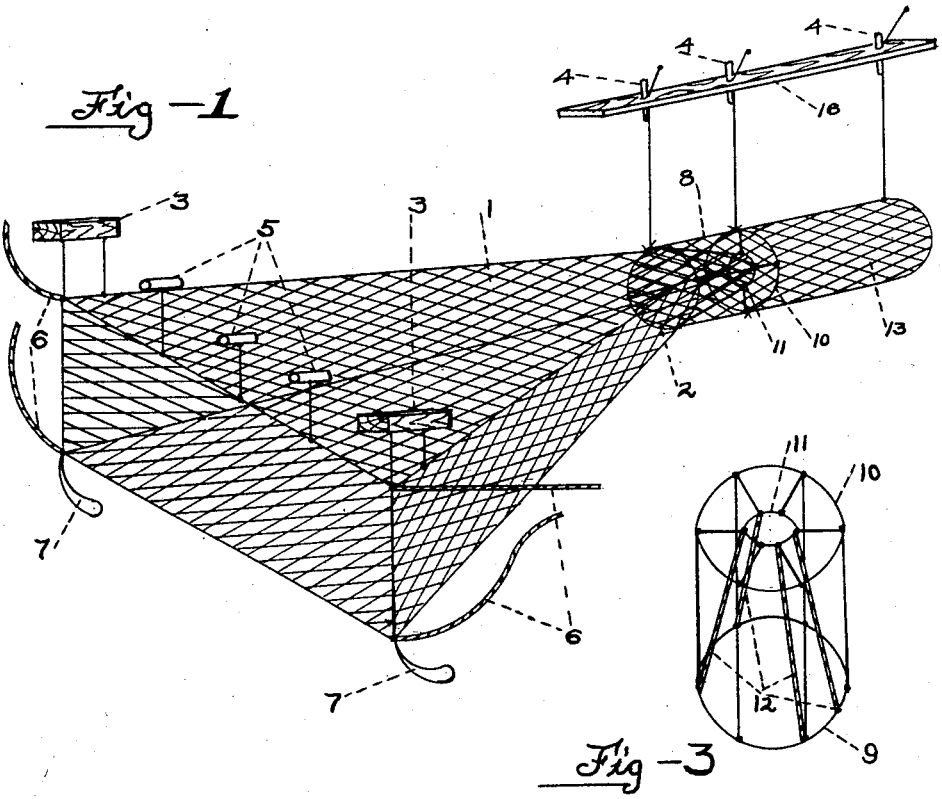
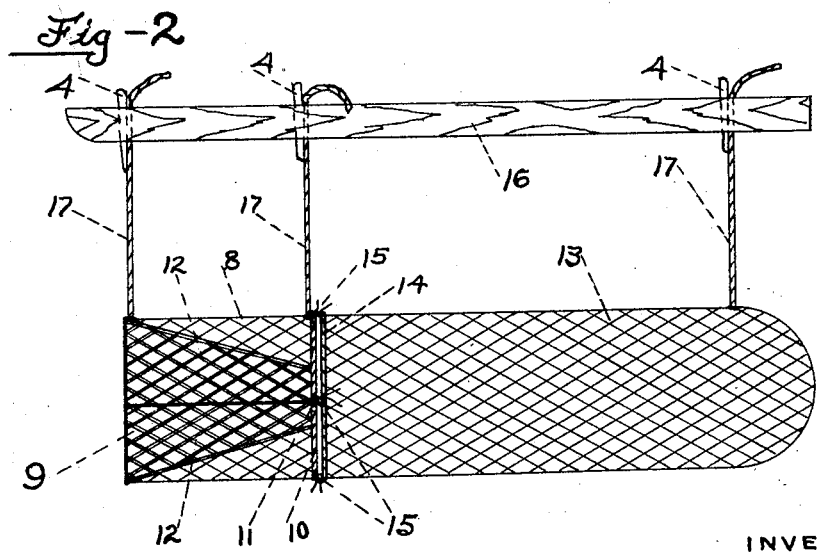
INVENTOR
IRVING REIMER
BY
J. L. Rivers.

UNITED STATES PATENT OFFICE.

IRVING REIMER, OF SEATTLE, WASHINGTON.

FLOATING FISHTRAP.

1,393,907.  Specification of Letters Patent. Patented Oct. 18, 1921.

Application filed November 22, 1920. Serial No. 425,698.

*To all whom it may concern:*

Be it known that I, IRVING REIMER, a citizen of the United States, residing at Seattle, in the county of King and State of Washington, have invented new and useful Improvements in Floating Fishtraps, of which the following is a specification.

This invention relates to floating fish traps adapted for towing purposes, and has for its objects the provision of a trap which is effective in catching fish; one that is equipped with floats and means whereby the depth of the trap in the water may be graduated, and the location of the trap made discernible by night as well as day, also having sections which are demountable, to facilitate the handling of the net and the discharge of fish therefrom.

I attain these objects by the devices illustrated in the accompanying drawings, in which—

Figure 1 is a perspective of the trap complete; Fig. 2, a side elevation of the tunnel and pot, together with the back float and connections therewith; Fig. 3, a view, in perspective, or the framework of the tunnel.

In the drawings, Fig. 1 represents the heart of the trap made of cords and netting the end adjacent the tunnel being provided with a metallic ring 2. 3 represent floats adjustably connected with the heart so that the depth of the trap in the water can be regulated. The floats are attached by cords extending through openings in the floats, and said adjustment can be effected through shortening or lengthening these cords by tying, or wedges 4 shown in detail in Fig. 2 may be utilized for the purpose of holding the cords in the openings and affording adjustment if desired. 5 represents a plurality of smaller floats likewise adjustable and adapted to give more buoyancy to the trap. 6 illustrates lines for towing purposes or other handling and 7 weights attached to the lower portion of the heart. 8 denotes the tunnel, the framework of which is cylindrical in outline and preferably of metal, the end adjacent the heart defining a ring 9 of the same diameter as the ring 2 connected with the heart. The other end of the tunnel, 10, as shown in detail in Fig. 3 is provided with a circular opening reduced in diameter, as shown at 11. A plurality of cords 12 are stretched between said larger and smaller openings of the tunnel, making within the tunnel a frame of cords in the form of a truncated cone. The metallic framework and the frame of cords are covered by netting as shown, permitting the fish to enter the pot 13, through the reduced portion of the tunnel 11, the size of the opening 11 and the action of the water in towing trapping the fish in the pot. The pot is of netting, one end closed and the end adjacent the tunnel provided with a metallic ring 14. The pot is attached to the tunnel by tying as shown at 15, and the heart is fastened to the other end of the tunnel in the same manner. 16 illustrates a large float adjustably connected with and adapted to sustain the tunnel and pot. By the same adjustment provided for the floats 3, the lines 17 connecting the float with the tunnel and pot may be shortened or lengthened for giving the trap the required depth in the water. The floats 3 and 15 are adapted to carry lights so that the exact location of the trap may be determined at night. This trap is made in a form to reduce as much as possible its resistance to the water in towing. The sides of the heart converge toward the cylindrical tunnel and pot of similar form, the closed end of the pot being rounded.

In operation, the lines 6 are attached to two boats and the trap towed between them, preferably with the current in order to give speed to the trap, the movement of the trap and the action of the floats and weights serving to keep the trap open and in operative position. The fish enter the heart, then through the reduced portion of the tunnel into the pot. The cone shaped portion, composed as it is of netting and cords, presents a flexible construction designed to prevent bruising of the fish and at the same time effectually trapping them. The adjustment of the floats, brought about in the simple manner described, gives the trap the required depth in the water, and permits the netted portions of the trap to escape extraneous objects, such as drift wood and the like, which may be floating on the water. In removing fish from the trap, it is only necessary to handle the pot. It can be lifted on board, unfastened from the tunnel, the fish removed, and the pot quickly replaced. The trap as a whole, being demountable in three parts, can be handled by two men, whereas the ordinary fish trap handling fish in the quantities that this one does, requires the services of four men.

I claim:

1. A fish trap, comprising in combination, a heart substantially triangular in form, provided at one end with an opening bounded by a metallic ring, a pot cylindrical in form having a rounded closed end the other end provided with an opening bounded by a metallic ring, interposed between the heart and the pot, a tunnel having a metallic framework cylindrical in outline, the end adjacent the heart having an opening conterminous with said opening in the heart, the end adjacent the pot and communicating therewith, having an opening reduced in diameter, a plurality of cords interiorly located and stretched between said openings in the tunnel, said cords covered by netting and defining in form a truncated cone, said framework also covered by netting and defining in form a cylinder, the heart, tunnel and pot connected with buoys provided with openings therethrough, lines extending from the trap and through said openings, wedges located in the openings and contacting with the cords whereby the location of the buoys may be adjusted with reference to the trap, means for attaching or detaching the heart, tunnel and pot, means for towing the trap and for maintaining the sides of the heart in approximately spaced vertical planes while in operative position.

2. In a fish trap, in combination with a heart and a pot, and interposed therebetween, a tunnel having a metallic framework cylindrical in outline, the end adjacent the heart having an opening conterminous with an opening in the heart, the end adjacent the pot and communicating therewith, having an opening reduced in diameter, a plurality of cords interiorly located and stretched between said openings in the tunnel, said cords covered by netting and defining in form a truncated cone, said framework also covered by netting and defining in form a cylinder.

IRVING REIMER.